United States Patent
Hegner et al.

(10) Patent No.: US 6,925,884 B2
(45) Date of Patent: Aug. 9, 2005

(54) CAPACITIVE DIFFERENTIAL PRESSURE SENSOR

(75) Inventors: Frank Hegner, Lörrach (DE); Ulfert Drewes, Müllheim (DE); Andreas Rossberg, Bad Säckingen (DE); Elke Schmidt, Schopfheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/472,766

(22) PCT Filed: Apr. 4, 2002

(86) PCT No.: PCT/EP02/03720

§ 371 (c)(1),
(2), (4) Date: Oct. 6, 2003

(87) PCT Pub. No.: WO02/088655

PCT Pub. Date: Nov. 7, 2002

(65) Prior Publication Data

US 2004/0105215 A1 Jun. 3, 2004

(30) Foreign Application Priority Data

Apr. 5, 2001 (DE) ......................................... 101 17 142

(51) Int. Cl.⁷ .............................................. G01L 15/00
(52) U.S. Cl. .............................. 73/716; 73/718; 73/724
(58) Field of Search ......................... 73/736, 716, 718, 73/724

(56) References Cited

U.S. PATENT DOCUMENTS

| | | | | |
|---|---|---|---|---|
| 4,572,000 A | * | 2/1986 | Kooiman ...................... | 73/718 |
| 5,050,035 A | | 9/1991 | Hegner et al. | |
| 5,481,905 A | * | 1/1996 | Pratt ............................ | 73/115 |
| 5,485,345 A | * | 1/1996 | Lukasiewicz et al. .... | 361/283.3 |
| 6,267,009 B1 | * | 7/2001 | Drewes et al. ................ | 73/718 |
| 6,425,290 B2 | * | 7/2002 | Willcox et al. ............... | 73/715 |
| 6,431,003 B1 | * | 8/2002 | Stark et al. .................... | 73/718 |
| 6,647,794 B1 | * | 11/2003 | Nelson et al. ................ | 73/718 |

FOREIGN PATENT DOCUMENTS

| | | |
|---|---|---|
| DE | 35 04 329 C2 | 8/1986 |
| DE | 39 32 443 C1 | 12/1990 |
| DE | 39 33 512 C2 | 4/1991 |
| DE | 41 24 662 A1 | 1/1993 |
| DE | 195 31 926 C2 | 2/1997 |
| DE | 196 48 048 A1 | 6/1997 |
| DE | 196 33 630 A1 | 2/1998 |
| DE | 197 41 037 C1 | 8/1999 |

* cited by examiner

*Primary Examiner*—Edward Lefkowitz
*Assistant Examiner*—Andre Allen
(74) *Attorney, Agent, or Firm*—Bacon & Thomas PLLC

(57) ABSTRACT

In a differential pressure sensor, the measurement value is corrected with the help of the nominal pressure NP. In this way, influences on the measurement value because of deformations of the body of the differential pressure sensor and change in the material stiffness of the membrane are decreased.

8 Claims, 2 Drawing Sheets

CAPACITIVE DIFFERENTIAL PRESSURE SENSOR

Figure 1:
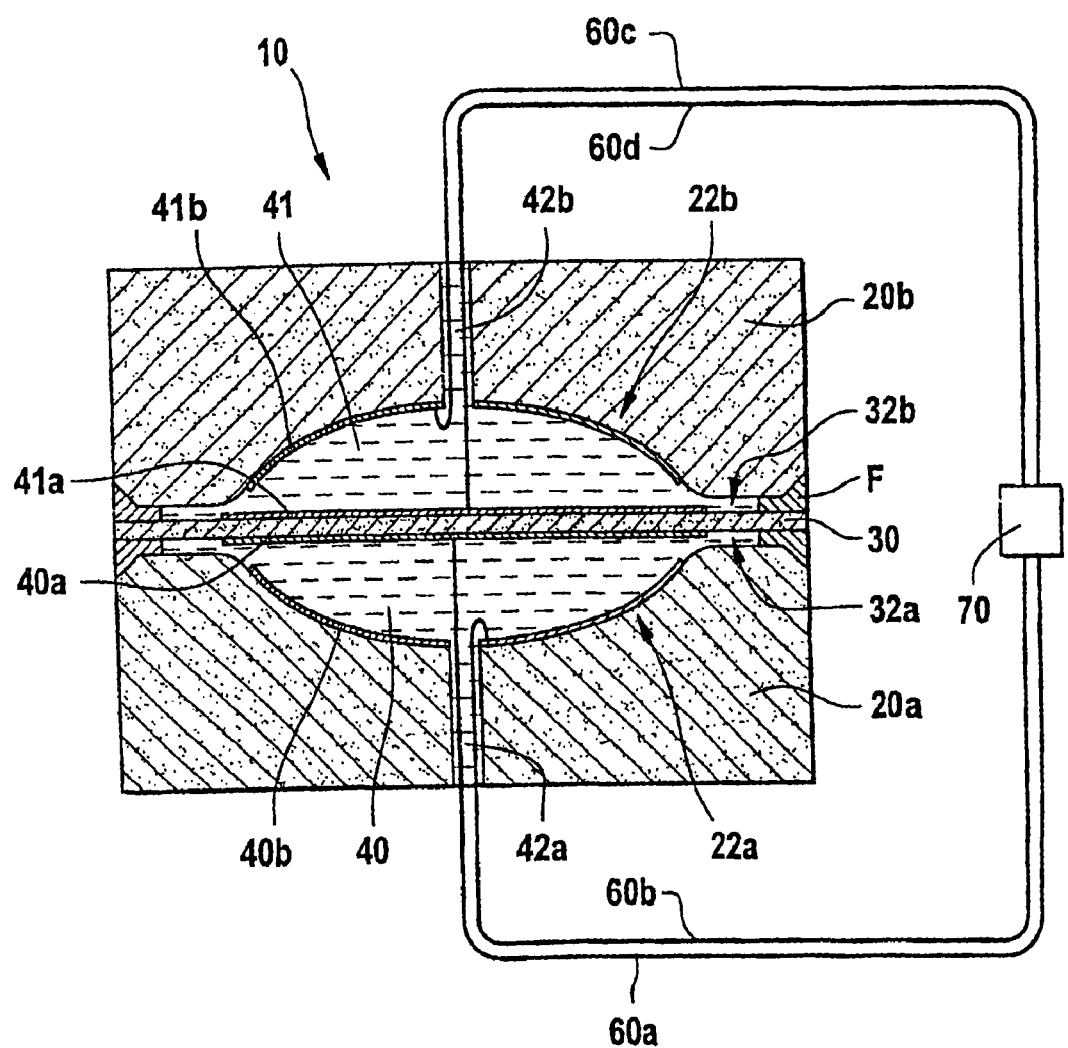

The invention relates to a capacitive differential pressure sensor.

Such differential pressure sensors are used frequently in process automation, in order to measure the differential pressure of process media, which can be liquids, gases or vapors.

Often, such differential pressure sensors are made of two ceramic bodies separated by a ceramic membrane. Each body has a shallow recess, which is also referred to as the membrane bed and which is spanned completely by the membrane.

Membrane bed and membrane together delimit a measurement chamber, which is separated from the actual process medium and, as a rule, filled with silicone oil as the pressure transfer medium. The pressure chambers are gas- or liquid-tight, as the case may be. This requires considerable expense in the manufacture of the connection between membrane and body.

Electrodes are provided on each membrane bed and on both sides of the membrane. The electrodes are applied usually by sputtering, vapor deposition or e.g. in the silk screen process, as described in U.S. Pat. No. 5,050,035. These four electrodes form, in pairs, two measurement capacitors, whose measurement signals are evaluated for determining the differential pressure.

If there are different pressures on the two sides of the membrane, then the membrane deforms elastically. This leads to a change in the separations of the two membrane electrodes from the membrane bed electrodes and thus to a capacitance change in the two measurement capacitors. The capacitance change in the measurement capacitors is a measure for the pressure difference present at the membrane. The measurement signals are evaluated with the help of an evaluation electronics connected to the four electrodes.

It has been found that, for equal pressure difference but different nominal pressure, a differential pressure sensor issues different measurement values.

Object of the invention is to create a ceramic differential pressure sensor that produces a measurement value which is independent of the nominal pressure, while being simple and cost-favorable to realize.

The object is solved by a differential pressure sensor comprised of a first ceramic body with a first membrane bed, a second ceramic body with a second membrane bed, a membrane, which is arranged between the two bodies and separates the two oppositely situated membrane beds from one another, a first measurement capacitor K1 for producing a first measurement signal S1 with a first electrode pair, which is present as one electrode on the membrane bed and one electrode on the membrane, a second measurement capacitor K2 for producing a second measurement signal S2 with a second electrode pair, which is present as one electrode on the membrane bed and one electrode on the membrane, an electronic circuit which determines from the two measurement signals S1 and S2 the capacitances CK1, CK2 of the two measurement capacitors K1, K2, which produces a signal $SIG1=1/CK1-1/CK2$, which is essentially proportional to the value of the pressure difference DP and which depends on the nominal pressure NP, which produces a signal $SIG2=1/CK1+1/CK2$, which is proportional to the value of the nominal pressure NP, wherein the dependence of the measurement value DP on the nominal pressure NP is corrected with the help of the signal SIG2.

Advantageously, the nominal pressure NP is determined using a polynomial expression.

Advantageously, the polynomial expression has the form $$NP=C0+C1*SIG1+C2*SIG1^2+C3*SIG2.$$

Advantageously, the pressure difference DP is subsequently determined using a polynomial expression, which contains the above determined nominal pressure NP.

Advantageously, this polynomial expression has the following form:

$$DP=C4+C5*SIG1+C6*SIG1*NP+C7*NP.$$

Essential concept of the invention is to correct the value of the pressure difference DP with the help of the nominal pressure NP, i.e. to minimize the dependence of the measurement value on the nominal pressure. In this procedure, nominal pressure NP and pressure difference DP are measured with the same sensor.

Figure 2:
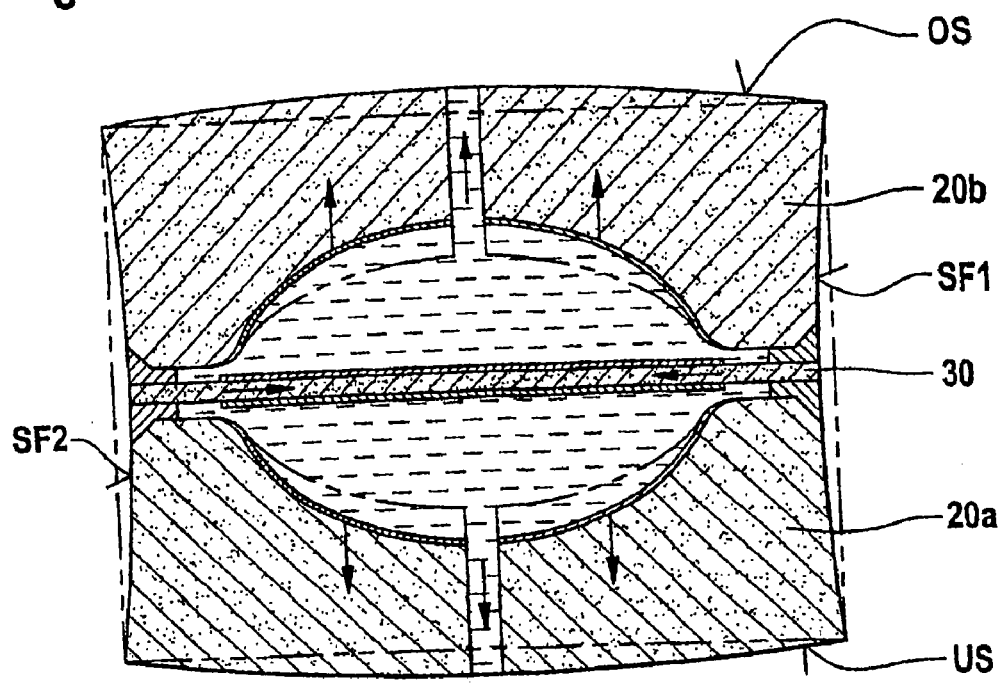
Figure 3:
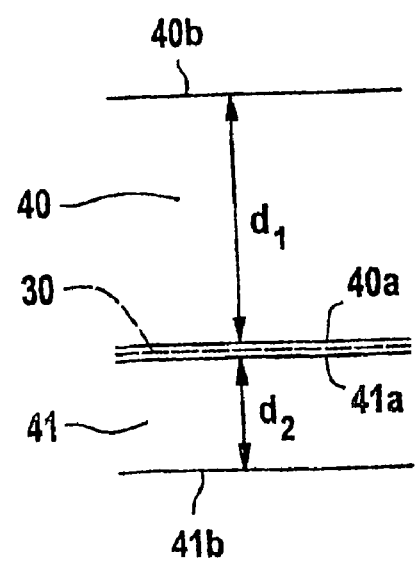

The invention is explained in greater detail on the basis of an example of an embodiment illustrated in the following drawings, which show as follows:

FIG. 1—schematic cross section of a capacitive pressure sensor,

FIG. 2—cross section of a differential pressure sensor as in FIG. 1 deformed under the influence of nominal pressure, and FIG. 3—schematic illustration for explaining the functioning of a differential pressure sensor.

FIG. 1 shows schematically a capacitive differential pressure sensor 10 in cross section. The sensor is essentially formed of two cylindrical bodies 20a, 20b and a circular membrane 30. Membrane 30 is arranged between the two bodies 20a, 20b and spans the membrane bed 22a, 22b of each body 20a, 20b. The connection between membrane 30 and the bodies 20a, 20b occurs along a joint F.

Body 20 and membrane 30 are made of a ceramic material, e.g. aluminum oxide. For gas- and liquid sealing of the joint, an active brazing compound is conceivable, produced under vacuum at about 900° C. In the joined state, membrane 30 forms with each body 20a, 20b a pressure chamber 40, 41, which is filled with a nearly incompressible liquid, e.g. a silicone oil. When the pressure difference is zero across the membrane, the same nominal pressure exists in each pressure chamber 40, 41. Each pressure chamber 40, 41 is loaded with pressure over its own canal 42a, 42b.

Each side 32a, 32b of the membrane 30 carries its own electrode 40a, 41a. The corresponding counter-electrodes 40b, 41b, are on the matching membrane beds 22a, 22b. Application of these electrodes can be done using e.g. sputtering, vapor deposition, or silk screening. The electrodes 40a, 40b essentially span the matching membrane beds 22a, 22b. However, they do not necessarily have to span them completely. Each of the electrode pairs 40a, 40b and 41a, 41b forms a measurement capacitor K1, K2, whose capacitance depends on the separation of its electrodes.

The electrode separations are determined essentially by the pressure difference DP which is present.

The layer thicknesses of the electrodes 40a, 40b have been enlarged in the drawings for purposes of illustration. The electrodes 40a, 40b are connected with an electronic circuit 70 over conductors 60a, 60b. The basic electronic circuit for evaluating the measurement signals S1 and S2 of the measurement capacitors K1, K2 for determining the pressure difference DP is state of the art and is therefore not discussed further.

FIG. 2 shows a differential pressure sensor 10 which has been deformed by the nominal pressure NP present in the pressure chambers 40, 41. The deformations have been exaggerated for purposes of illustration. Dashed lines show the contours of the differential pressure sensor 10 for zero nominal pressure.

The increased pressure (nominal pressure NP) inside the differential pressure sensor 10 bulges the membrane beds 22a, 22b, upwards and downwards, as the case may be. This results in a constriction of the differential pressure sensor 10 in the area of the membrane 30 at the side surfaces SF1, SF2 of the sensor.

The constriction in the area of the membrane 30 changes, as well, the stiffness of the membrane 30, due to the change where the membrane is held. The nominal pressure NP has yet another influence on the stiffness of the membrane material 30: If there is a relatively high pressure on both sides of the membrane, then the pressure difference causes a smaller displacement of the membrane 30 than at smaller nominal pressure NP. The two effects oppose one another.

FIG. 3 shows the basics of how the differential pressure sensor of FIG. 1 operates. For simplification, special membrane bed shapes are not drawn. Instead, each electrode pair 40a, 40b and 41a, 41b is given a constant separation. The first capacitor K1 corresponds to the upper part of the drawing and the second capacitor K2 to the lower part. The electrode separation for the electrodes 40a, 40b is d1, while that for the electrodes 41a, 41b is d2. The capacitances CK1 and CK2, respectively, of the capacitors K1 and K2 depend on the corresponding separations d1 and d2. The evaluation circuit 70 uses these capacitances to produce the actual sensor signals.

From the difference of the two reciprocals of these capacitances CK1 and CK2, a signal SIG1=1/CK1−1/CK2 is produced. To a first approximation, the signal SIG1 is proportional to the pressure difference DP. It is, however, dependent on the above-described stiffness changes of the membrane 30 under the influence of the nominal pressure NP.

Because of this fact, the pressure difference DP must be corrected as a function of the existing nominal pressure NP. The nominal pressure NP is essentially proportional to the sum of the two reciprocals of the capacitances CK1, CK2, i.e. to the signal SIG2=1/CK1+1/CK2. That is, the nominal pressure NP is essentially proportional to the sum of the two separations d1 and d2 and independent of the deflection and stiffness of the membrane.

Advantageously, the nominal pressure NP is determined using a polynomial expression, in which also the signal SIG1, in other words the influence of the pressure difference, is considered. The polynomial expression has e.g. the form NP=C0+C1*SIG1+C2*SIG1²+C3*SIG2.

Advantageously, the pressure difference DP is subsequently determined using a polynomial expression, which contains the nominal pressure NP. The polynomial expression has e.g. the form:

$$DP=C4+C5*SIG1+C6*SIG1*NP+C7*NP.$$

The quantities C1–C7 are in all equations are constants.

The invention is not limited to ceramic pressure sensors. Other materials are also conceivable, such as e.g. silicon. The invention is also not limited to differential pressure sensors with membrane bed.

Essential concept of the invention is to correct the value of the pressure difference DP with the help of the nominal pressure NP, i.e. to minimize the dependence of the measurement value of the differential pressure sensor on nominal pressure. In this procedure, nominal pressure NP and pressure difference DP are measured with the same sensor.

What is claimed is:

1. Differential pressure sensor comprising
   a first ceramic body (20a) with a first membrane bed (22a),
   a second ceramic body (20b) with a second membrane bed (22b),
   a membrane (30), which is arranged between the two bodies (20a, 20b) and separates the two oppositely situated membrane beds (22a, 22b) from one another,
   a first measurement capacitor K1 for producing a first measurement signal S1 with a first electrode pair (40a, 40b), which is present as one electrode on the membrane bed (22a) and one electrode on the membrane (30),
   a second measurement capacitor K2 for producing a second measurement signal S2 with a second electrode pair (41a, 41b), which is present as one electrode on the membrane bed (22b) and one electrode on the membrane (30),
   an electronic circuit
   which determines from the two measurement signals S1 and S2 the capacitances CK1, CK2 of the two measurement capacitors K1, K2,
   which produces a signal SIG1=1/CK1−1/CK2, which is essentially proportional to the value of the pressure difference DP and which depends on the nominal pressure NP,
   which produces a signal SIG2=1/CK1+1/CK2, which is proportional to the value of the nominal pressure NP,
   wherein the dependence of the measurement value DP on the nominal pressure NP is corrected with the help of the signal SIG2.

2. Differential pressure sensor as claimed in claim 1, characterized in that the nominal pressure NP is determined from a polynomial expression.

3. Differential pressure sensor as claimed in claim 2, characterized in that the polynomial expression has the form PN=C0+C1*SIG1+C2*SIG1²+C3*SIG2.

4. Differential pressure sensor as claimed in claim 3, characterized in that the pressure difference DP is determined from the equation DP=C4+C5*SIG1+C6*SIG1*PN+C7*PN.

5. Differential pressure sensor as claimed in claim 1, characterized in that it is of ceramic.

6. Differential pressure sensor as claimed in claim 2, characterized in that it is of ceramic.

7. Differential pressure sensor as claimed in claim 3, characterized in that it is of ceramic.

8. Differential pressure sensor as claimed in claim 4, characterized in that it is of ceramic.

* * * * *